US008140112B2

(12) United States Patent
Shaheen et al.

(10) Patent No.: US 8,140,112 B2
(45) Date of Patent: *Mar. 20, 2012

(54) METHOD AND APPARATUS FOR HANDOFF BETWEEN A WIRELESS LOCAL AREA NETWORK (WLAN) AND A UNIVERSAL MOBILE TELECOMMUNICATION SYSTEM (UMTS)

(75) Inventors: Kamel M. Shaheen, King of Prussia, PA (US); Brian G. Kiernan, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/545,180

(22) Filed: Oct. 10, 2006

(65) Prior Publication Data

US 2007/0032239 A1 Feb. 8, 2007

Related U.S. Application Data

(63) Continuation of application No. 11/111,569, filed on Apr. 21, 2005, now Pat. No. 7,120,460, which is a continuation of application No. 10/294,065, filed on Nov. 14, 2002, now Pat. No. 7,047,036.

(60) Provisional application No. 60/393,413, filed on Jul. 2, 2002.

(51) Int. Cl.
*H04M 1/00* (2006.01)

(52) U.S. Cl. ............... 455/552.1; 455/436; 455/439; 455/442

(58) Field of Classification Search ............ 455/436, 455/437, 438, 439, 444, 454, 422.1, 445, 455/426.1, 552.1, 553.1, 168.1; 370/252, 370/320, 328, 331, 332, 338, 412, 466, 470; 709/205, 227, 235
See application file for complete search history.

(56) References Cited

U.S. PATENT DOCUMENTS

| | | |
|---|---|---|
| 3,952,610 A | 4/1976 | Hope et al. |
| 5,611,050 A | 3/1997 | Theimer et al. |
| 5,666,650 A | 9/1997 | Turcotte et al. |
| 5,787,347 A | 7/1998 | Yu et al. |

(Continued)

FOREIGN PATENT DOCUMENTS

EP 0852448 7/1998

(Continued)

OTHER PUBLICATIONS

Morand et al., "Global Mobility Approach with Mobile IP in "All IP" Networks,"IEEE International Conference on Communications, ICC 2002, vol. 4, pp. 2075-2079.

(Continued)

*Primary Examiner* — Jean Gelin
(74) *Attorney, Agent, or Firm* — Volpe and Koenig, P.C.

(57) ABSTRACT

Apparatus and method for providing an automatic handoff process of a dual-mode user equipment (UE) from either a wireless local area network (WLAN) to a universal mobile telecommunications system (UMTS) or from a UMTS to a WLAN. Handoffs may be initiated by the UE, based upon user preference, signal quality, comparison of location coordinates of the UE and the system to be switched to or signal quality. The available channels of one system may be sent to the UE by the other system or the UE may monitor channels of the system to be switched to and lock on to one. The handoff may also be initiated by the UMTS, the selection being power-based.

20 Claims, 7 Drawing Sheets

U.S. PATENT DOCUMENTS

| | | |
|---|---|---|
| 5,826,188 A | 10/1998 | Tayloe et al. |
| 5,862,480 A | 1/1999 | Wild et al. |
| 5,930,700 A | 7/1999 | Pepper et al. |
| 5,946,634 A | 8/1999 | Korpela |
| 5,999,816 A | 12/1999 | Tiedemann et al. |
| 6,057,782 A | 5/2000 | Koenig |
| 6,061,565 A | 5/2000 | Innes et al. |
| 6,112,093 A | 8/2000 | Nordlund |
| 6,115,608 A | 9/2000 | Duran et al. |
| 6,128,490 A | 10/2000 | Shaheen et al. |
| 6,201,968 B1 | 3/2001 | Ostroff et al. |
| 6,243,581 B1 | 6/2001 | Jawanda |
| 6,304,755 B1 | 10/2001 | Tiedemann et al. |
| 6,353,602 B1 | 3/2002 | Cheng et al. |
| 6,385,772 B1 | 5/2002 | Courtney |
| 6,400,265 B1 | 6/2002 | Saylor et al. |
| 6,400,951 B1 | 6/2002 | Vaara |
| 6,470,184 B1 | 10/2002 | Machida |
| 6,487,410 B1 | 11/2002 | Kontio et al. |
| 6,546,246 B1 | 4/2003 | Bridges et al. |
| 6,591,103 B1 | 7/2003 | Dunn et al. |
| 6,594,242 B1 | 7/2003 | Kransmo |
| 6,600,758 B1 | 7/2003 | Mazur et al. |
| 6,615,048 B1 | 9/2003 | Hayashi |
| 6,643,513 B2 | 11/2003 | Timonen et al. |
| 6,668,175 B1 | 12/2003 | Almgren et al. |
| 6,680,923 B1 | 1/2004 | Leon |
| 6,718,178 B1 | 4/2004 | Sladek et al. |
| 6,721,565 B1 | 4/2004 | Ejzak et al. |
| 6,735,433 B1 | 5/2004 | Cervantes |
| 6,768,726 B2 | 7/2004 | Dorenbosch et al. |
| 6,771,964 B1 | 8/2004 | Einola et al. |
| 6,801,772 B1 | 10/2004 | Townend et al. |
| 6,826,154 B2 * | 11/2004 | Subbiah et al. ............... 370/236 |
| 6,829,481 B2 | 12/2004 | Souissi |
| 6,832,093 B1 | 12/2004 | Ranta |
| 6,845,238 B1 | 1/2005 | Muller |
| 6,894,988 B1 | 5/2005 | Zehavi |
| 6,961,561 B2 | 11/2005 | Himmel et al. |
| 6,963,745 B2 | 11/2005 | Singh et al. |
| 6,973,309 B1 | 12/2005 | Rygula et al. |
| 7,006,828 B1 | 2/2006 | Czaja et al. |
| 7,009,952 B1 * | 3/2006 | Razavilar et al. ............. 370/331 |
| 7,016,691 B2 | 3/2006 | Yaguchi et al. |
| 7,089,008 B1 | 8/2006 | Back et al. |
| 7,092,710 B1 | 8/2006 | Stoter et al. |
| 7,092,743 B2 | 8/2006 | Vegh |
| 7,096,015 B2 | 8/2006 | Bridges et al. |
| 7,133,384 B2 | 11/2006 | Park et al. |
| 7,146,636 B2 | 12/2006 | Crosbie |
| 7,149,521 B2 * | 12/2006 | Sundar et al. ............... 455/435.1 |
| 7,155,225 B2 | 12/2006 | Segal et al. |
| 7,164,923 B2 | 1/2007 | Tsunomoto et al. |
| 7,181,218 B2 | 2/2007 | Ovesjo et al. |
| 7,200,401 B1 | 4/2007 | Hulkkonen et al. |
| 7,206,318 B2 | 4/2007 | Keller |
| 7,254,119 B2 | 8/2007 | Jiang et al. |
| 7,263,367 B1 | 8/2007 | Sabot |
| 7,283,507 B2 | 10/2007 | Buckley et al. |
| 7,376,098 B2 | 5/2008 | Loeffler et al. |
| 7,418,267 B2 | 8/2008 | Karaoguz |
| 7,486,635 B2 | 2/2009 | Okanoue et al. |
| 7,508,799 B2 * | 3/2009 | Sumner et al. ............... 370/338 |
| 7,610,049 B2 | 10/2009 | Watanabe |
| 2002/0022478 A1 | 2/2002 | Iwao |
| 2002/0024937 A1 | 2/2002 | Barnard et al. |
| 2002/0025810 A1 | 2/2002 | Takayama et al. |
| 2002/0032034 A1 | 3/2002 | Tiedemann et al. |
| 2002/0032748 A1 | 3/2002 | Myojo |
| 2002/0068570 A1 | 6/2002 | Abrol et al. |
| 2002/0082044 A1 | 6/2002 | Davenport |
| 2002/0120749 A1 | 8/2002 | Widegren et al. |
| 2002/0136226 A1 | 9/2002 | Christoffel et al. |
| 2002/0146021 A1 | 10/2002 | Schwartz et al. |
| 2002/0147008 A1 * | 10/2002 | Kallio ........................... 455/426 |
| 2002/0147012 A1 | 10/2002 | Leung et al. |
| 2002/0180582 A1 | 12/2002 | Nielsen |
| 2003/0002525 A1 | 1/2003 | Grilli et al. |
| 2003/0003933 A1 | 1/2003 | Deshpande et al. |
| 2003/0012156 A1 | 1/2003 | Fukuda |
| 2003/0013443 A1 | 1/2003 | Willars et al. |
| 2003/0013463 A1 | 1/2003 | Yen |
| 2003/0045322 A1 | 3/2003 | Baer et al. |
| 2003/0046546 A1 | 3/2003 | Endo |
| 2003/0080996 A1 | 5/2003 | Lavin et al. |
| 2003/0081567 A1 | 5/2003 | Okanoue et al. |
| 2003/0092444 A1 | 5/2003 | Sengodan et al. |
| 2003/0100307 A1 | 5/2003 | Wolochow et al. |
| 2003/0114158 A1 * | 6/2003 | Soderbacka et al. .......... 455/436 |
| 2003/0118015 A1 | 6/2003 | Gunnarsson et al. |
| 2003/0119480 A1 | 6/2003 | Mohammed |
| 2003/0123479 A1 | 7/2003 | Lee et al. |
| 2003/0125028 A1 | 7/2003 | Reynolds |
| 2003/0142641 A1 | 7/2003 | Sumner et al. |
| 2003/0148777 A1 | 8/2003 | Watanabe et al. |
| 2003/0148786 A1 | 8/2003 | Cooper et al. |
| 2003/0149875 A1 | 8/2003 | Hosaka |
| 2003/0163558 A1 | 8/2003 | Cao et al. |
| 2003/0174667 A1 | 9/2003 | Krishnamurthi et al. |
| 2003/0179726 A1 | 9/2003 | Forssell et al. |
| 2003/0206533 A1 | 11/2003 | Charas |
| 2003/0208602 A1 | 11/2003 | Bhalla et al. |
| 2004/0002343 A1 | 1/2004 | Brauel et al. |
| 2004/0008645 A1 * | 1/2004 | Janevski et al. ............... 370/331 |
| 2004/0014474 A1 | 1/2004 | Kanada |
| 2004/0018829 A1 | 1/2004 | Raman et al. |
| 2004/0028009 A1 | 2/2004 | Dorenbosch et al. |
| 2004/0029587 A1 | 2/2004 | Hulkkonen et al. |
| 2004/0033805 A1 | 2/2004 | Verma et al. |
| 2004/0058717 A1 | 3/2004 | McDonnell et al. |
| 2004/0063426 A1 | 4/2004 | Hunkeler |
| 2004/0068571 A1 | 4/2004 | Ahmavaara |
| 2004/0090937 A1 | 5/2004 | Chaskar et al. |
| 2004/0092259 A1 | 5/2004 | Blanc et al. |
| 2004/0100913 A1 | 5/2004 | Kalliokulju et al. |
| 2004/0103204 A1 | 5/2004 | Yegin |
| 2004/0105434 A1 | 6/2004 | Baw |
| 2004/0114553 A1 | 6/2004 | Jiang et al. |
| 2004/0127241 A1 | 7/2004 | Shostak |
| 2004/0152480 A1 | 8/2004 | Willars et al. |
| 2004/0157600 A1 | 8/2004 | Stumpert et al. |
| 2004/0176103 A1 | 9/2004 | Trossen et al. |
| 2004/0185845 A1 | 9/2004 | Abhishek et al. |
| 2004/0203732 A1 * | 10/2004 | Brusilovsky et al. ....... 455/426.1 |
| 2004/0203748 A1 | 10/2004 | Kappes et al. |
| 2004/0203773 A1 | 10/2004 | Balasubramanian et al. |
| 2004/0203873 A1 | 10/2004 | Gray |
| 2004/0203890 A1 | 10/2004 | Karaoguz et al. |
| 2004/0218605 A1 | 11/2004 | Gustafsson et al. |
| 2004/0235455 A1 | 11/2004 | Jiang |
| 2004/0264410 A1 | 12/2004 | Sagi et al. |
| 2005/0025164 A1 | 2/2005 | Kavanagh et al. |
| 2005/0047373 A1 | 3/2005 | Kojima |
| 2005/0059410 A1 | 3/2005 | Trossen et al. |
| 2005/0064877 A1 | 3/2005 | Gum et al. |
| 2005/0070289 A1 | 3/2005 | Vestama et al. |
| 2005/0090259 A1 | 4/2005 | Jain et al. |
| 2005/0107093 A1 | 5/2005 | Dowling |
| 2005/0153725 A1 | 7/2005 | Naghian et al. |
| 2005/0176445 A1 | 8/2005 | Qu et al. |
| 2005/0177733 A1 | 8/2005 | Stadelmann et al. |
| 2005/0181776 A1 * | 8/2005 | Verma et al. .................. 455/418 |
| 2005/0202791 A1 | 9/2005 | Krause et al. |
| 2005/0250491 A1 | 11/2005 | Roy |
| 2005/0288019 A1 | 12/2005 | Park et al. |
| 2006/0004643 A1 | 1/2006 | Stadelmann et al. |
| 2006/0052100 A1 | 3/2006 | Almgren |
| 2006/0056448 A1 | 3/2006 | Zaki et al. |
| 2006/0084440 A1 | 4/2006 | Bakri |
| 2006/0194582 A1 | 8/2006 | Cooper |
| 2006/0291455 A1 * | 12/2006 | Katz et al. ..................... 370/355 |
| 2006/0293053 A1 | 12/2006 | Zanaty |
| 2007/0072603 A1 | 3/2007 | Wang |
| 2007/0093201 A1 | 4/2007 | Hsu et al. |
| 2007/0112948 A1 | 5/2007 | Uhlik |
| 2007/0208864 A1 | 9/2007 | Flynn et al. |
| 2007/0217366 A1 | 9/2007 | Sagi et al. |

| | | | |
|---|---|---|---|
| 2007/0259653 | A1 | 11/2007 | Tang et al. |
| 2008/0101291 | A1 | 5/2008 | Jiang et al. |
| 2008/0240036 | A1 | 10/2008 | Liu et al. |

FOREIGN PATENT DOCUMENTS

| | | |
|---|---|---|
| EP | 1081909 | 3/2001 |
| EP | 1178646 | 2/2002 |
| EP | 1213941 | 6/2002 |
| EP | 1257141 | 11/2002 |
| EP | 1278143 | 1/2003 |
| EP | 1395076 | 3/2004 |
| EP | 1597868 | 11/2005 |
| GB | 2322051 | 8/1998 |
| GB | 2377130 | 12/2002 |
| GB | 2391432 | 2/2004 |
| JP | 10-004580 | 1/1998 |
| JP | 2000-092541 | 3/2000 |
| JP | 2000-270356 | 9/2000 |
| JP | 2001-258058 | 9/2001 |
| JP | 2003-264868 | 9/2003 |
| JP | 2004-320473 | 11/2004 |
| JP | 2004-349976 | 12/2004 |
| JP | 2005-295332 | 10/2005 |
| KR | 2000-0060796 | 10/2000 |
| KR | 2002-0037564 | 5/2002 |
| KR | 2004-0051329 | 6/2004 |
| TW | 243573 | 3/1995 |
| TW | 300943 | 3/1997 |
| WO | 96/36190 | 11/1996 |
| WO | 99/67902 | 12/1999 |
| WO | 00/04718 | 1/2000 |
| WO | 00/60895 | 10/2000 |
| WO | 00/65802 | 11/2000 |
| WO | 01/28154 | 4/2001 |
| WO | 01/31963 | 5/2001 |
| WO | 01/35585 | 5/2001 |
| WO | 01/58177 | 8/2001 |
| WO | 01/69858 | 9/2001 |
| WO | 02/11358 | 2/2002 |
| WO | 02/13157 | 2/2002 |
| WO | 02/30133 | 4/2002 |
| WO | 02/062094 | 8/2002 |
| WO | 02/080605 | 10/2002 |
| WO | 03/003639 | 1/2003 |
| WO | 03/024144 | 3/2003 |
| WO | 03/045095 | 5/2003 |
| WO | 03/054721 | 7/2003 |
| WO | 03/079660 | 9/2003 |
| WO | 2004/006482 | 1/2004 |
| WO | 2004/089021 | 10/2004 |
| WO | 2004/100452 | 11/2004 |
| WO | 2005/051026 | 6/2005 |
| WO | 2006/020168 | 2/2006 |

OTHER PUBLICATIONS

IEEE P802.21/D01.00, Mar. 2006, Draft IEEE Standard for Local and Metropolitan Area Networks: Media Independent Handover Services.

Morand et al., "Global Mobility Approach with Mobile IP in "All IP" Networks,"IEEE International Conference on Communications, ICCC 2002, vol. 4, pp. 2075-2079, (2002).

IEEE P802.21/D01.00, Mar. 2006, Draft IEEE Standard for Local and Metropolitan Area Networks: Media Independent Handover Series.

Morand et al., "Global Mobility Approach with Mobile IP in "All IP" Networks," IEEE International Conference on Communications, ICC 2002, vol. 4, pp. 2075-2079.

3GPP TSG CN #9, Hawaii, USA, Sep. 20-22, 2000, Tdoc 3GPP NP-000451.

IEEE P802.21/D01.00, Mar. 2006, Draft IEEE Standard for Local and Metropolitan Area Networks: Media Indepent Handover Services.

Jassemuddin, "An Architecture for Integrating UMTS and 802.11 WLAN Networks." Proceedings of the $8^{th}$ IEEE International Symposium on Computers and Communication, 2003, pp. 716-723.

Morand et al., "Global Mobility Approach with Mobile IP in "All IP" Networks," IEEE International Conference on Communications, ICC 2002, vol. 4, pp. 2075-2079, (2002).

Parkvall, "Long-Term 3G Radio Access," Ericsson Research (Nov. 12, 2005).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.6.1 (May 2002).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.8.0 (Sep. 2002).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.1.1 (May 2002).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5)," 3GPP TS 44.060 V5.3.0 (Sep. 2002).

Third Generation Partnership Project, "Technical Specification Group Services and System Aspects; Feasibility study on 3GPP system to Wireless Local Area Network (WLAN) interworking; (Release 6)," 3GPP TR 22.934 V1.0.0 (Feb. 2002).

Third Generation Partnership Project, "Technical Specification Group Services and System Aspects; Feasibility study on 3GPP system to Wireless Local Area Network (WLAN) interworking; (Release 6)," 3GPP TR 22.934 V6.0.0 (Sep. 2002).

Third Generation Partnership Project, "Technical Specification Group Services and System Aspects; 3GPP system to Wireless Local Area Network (WLAN) interworking; System description (Release 6)," 3GPP TS 23.234 V1.0.0 (Sep. 2002).

Third Generation Partnership Project, "Technical Specification Group Radio Access Network; Radio Resource Control (RRC); Protocol Specification (Release 4)," 3GPP TS 25.331 V4.5.0 (Jun. 2002).

Third Generation Partnership Project, "Technical Specification Group Radio Access Network; Radio Resource Control (RRC); Protocol Specification (Release 4)," 3GPP TS 25.331 V4.7.0 (Sep. 2002).

Third Generation Partnership Project, "Technical Specification Group Radio Access Network; Radio Resource Control (RRC); Protocol Specification (Release 5)," 3GPP TS 25.331 V5.1.0 (Jun. 2002).

Third Generation Partnership Project, "Technical Specification Group Radio Access Network; Radio Resource Control (RRC); Protocol Specification (Release 5)," 3GPP TS 25.331 V5.2.0 (Sep. 2002).

UMA Architecture (Stage 2) R1.0.4, May 2, 2005, Unlicensed Mobile Access (UMA); Architecture (Stage 2).

Zhang et al., "Integration of Wireless LAN and 3G Wireless—Efficianet Mobility Management for Vertical Handoff between WWAN and WLAN,".

* cited by examiner

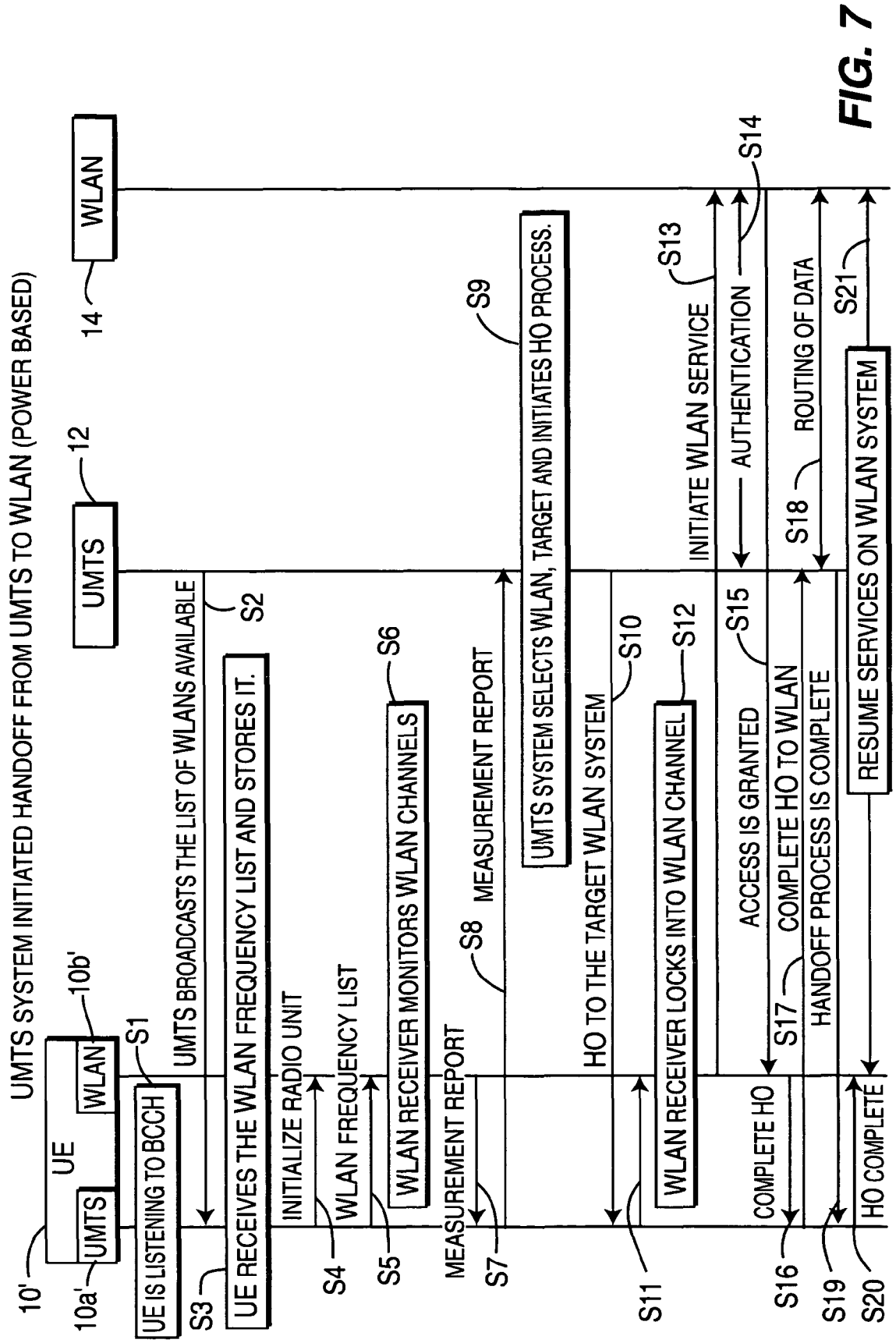

METHOD AND APPARATUS FOR HANDOFF BETWEEN A WIRELESS LOCAL AREA NETWORK (WLAN) AND A UNIVERSAL MOBILE TELECOMMUNICATION SYSTEM (UMTS)

CROSS REFERENCE TO RELATED APPLICATIONS

This application is a continuation of U.S. patent application Ser. No. 11/111,569, filed Apr. 21, 2005, which is a continuation of U.S. patent application Ser. No. 10/294,065, filed Nov. 14, 2002, which claims priority from U.S. Provisional Application Ser. No. 60/393,413, filed Jul. 2, 2002, which are incorporated by reference as if fully set forth.

BACKGROUND

The present invention relates to WLAN and UMTS systems. More particularly, the present invention relates to apparatus and techniques for automatic handoff between WLAN and UMTS Systems.

The triggering of a handoff process between a UMTS System and a WLAN System can be performed by a manual handoff process initiated by the user wherein the user knows the existence of the WLAN coverage in the current geographic location and switches "on" its WLAN connection.

Nevertheless, it is extremely desirous to provide an automatic handoff process.

SUMMARY

The present invention is characterized by providing automatic handoff techniques which may be either UE-initiated or system-initiated.

Regarding-UE initiated techniques, the UE detects the existence of a WLAN footprint and initiates the handoff (HO) process based on a user preference. Alternatively, the UE may track the locations of WLAN coverage areas and initiate the HO process within a specific range from the WLAN.

System initiated techniques include the following:

Power measurements requested from the UE by the system which include a set of all WLAN frequencies. The system initiates the HO procedures based on a set of criteria which includes the mobility of the UE and the desired applications, when the UE is within the WLAN coverage area.

As another embodiment, the system tracks the UE location and initiates the HO procedures based on a set of criteria, including mobility of the UE and the requested applications, when the UE is within the WLAN coverage area.

BRIEF DESCRIPTION OF THE DRAWING(S)

The present invention will be understood from consideration of the detailed description and drawings wherein like elements are designated by like numerals, and wherein:

FIG. 7 is a flow diagram showing a UMTS system initiated handoff of a UE from a UMTS to a WLAN, which is power based.

DETAILED DESCRIPTION OF THE PREFERRED EMBODIMENT(S)

Figure 1:
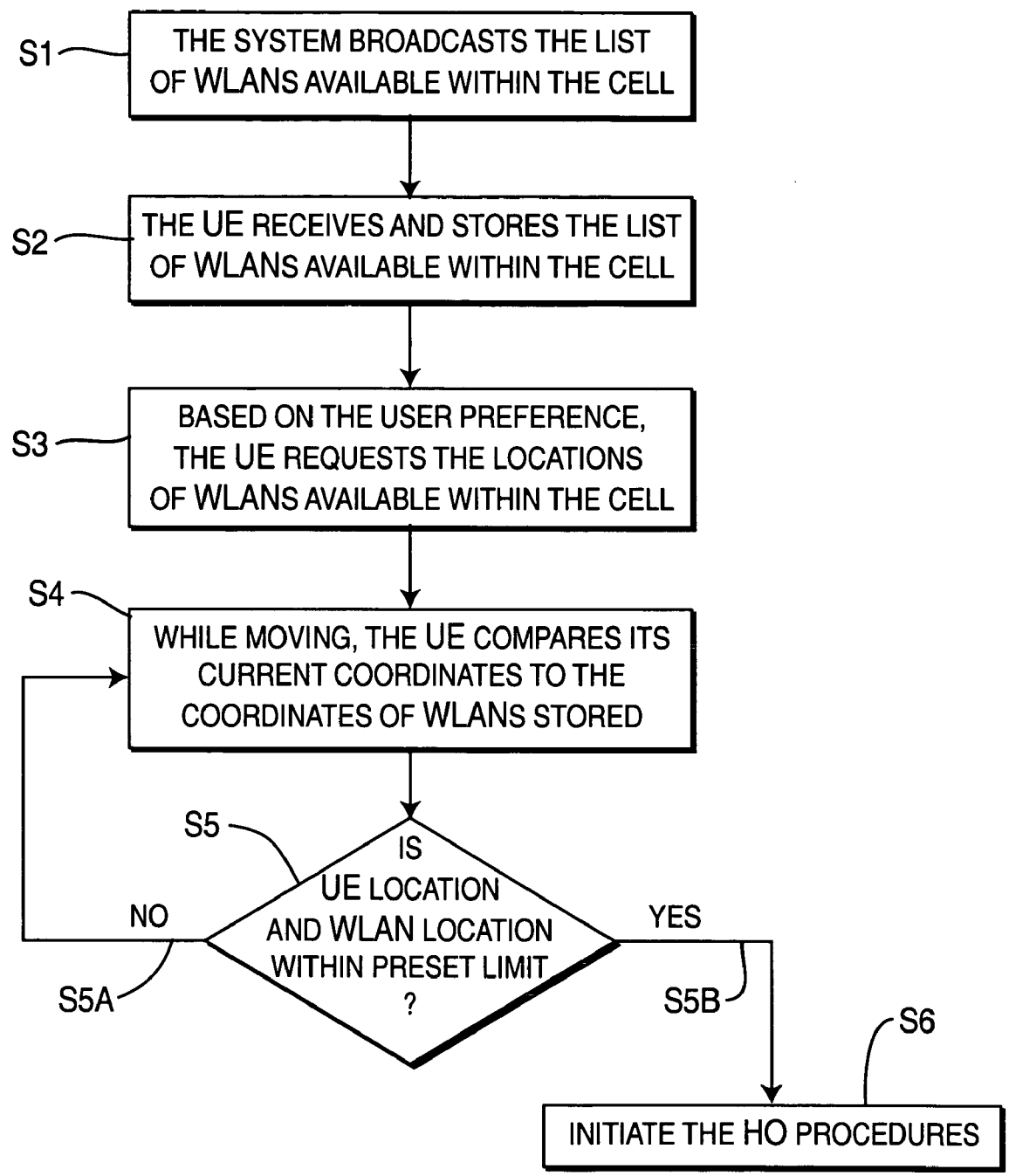
FIG. 1 is a flow diagram showing a UE initiated handoff from a UMTS to a WLAN.

A UE-initiated handoff from an UMTS 12 to a WLAN 14 is shown in the flow diagram of FIG. 1 wherein, at step S1, the system (UMTS) broadcasts a list of WLANs available within the cell in which the UE10 is located. The UE10 receives and stores a list of all WLANs available within that cell, at step S2. At step S3, the UE10 requests the locations of WLANs available within the cell, said request being based upon user preference. At step S4, the UE10, as it is moving, compares its current coordinates with the coordinates of those WLANs stored. At step S5, a determination is made as to whether the UE10 location and the WLAN14 location are within a preset limit. If not, the program jumps, at step S5A, back to step S4. In the event that the UE10 and WLAN14 locations are within the preset limit, the program jumps, at step S5B, to step S6 whereupon the handoff (HO) procedure is initiated.

Figure 2:
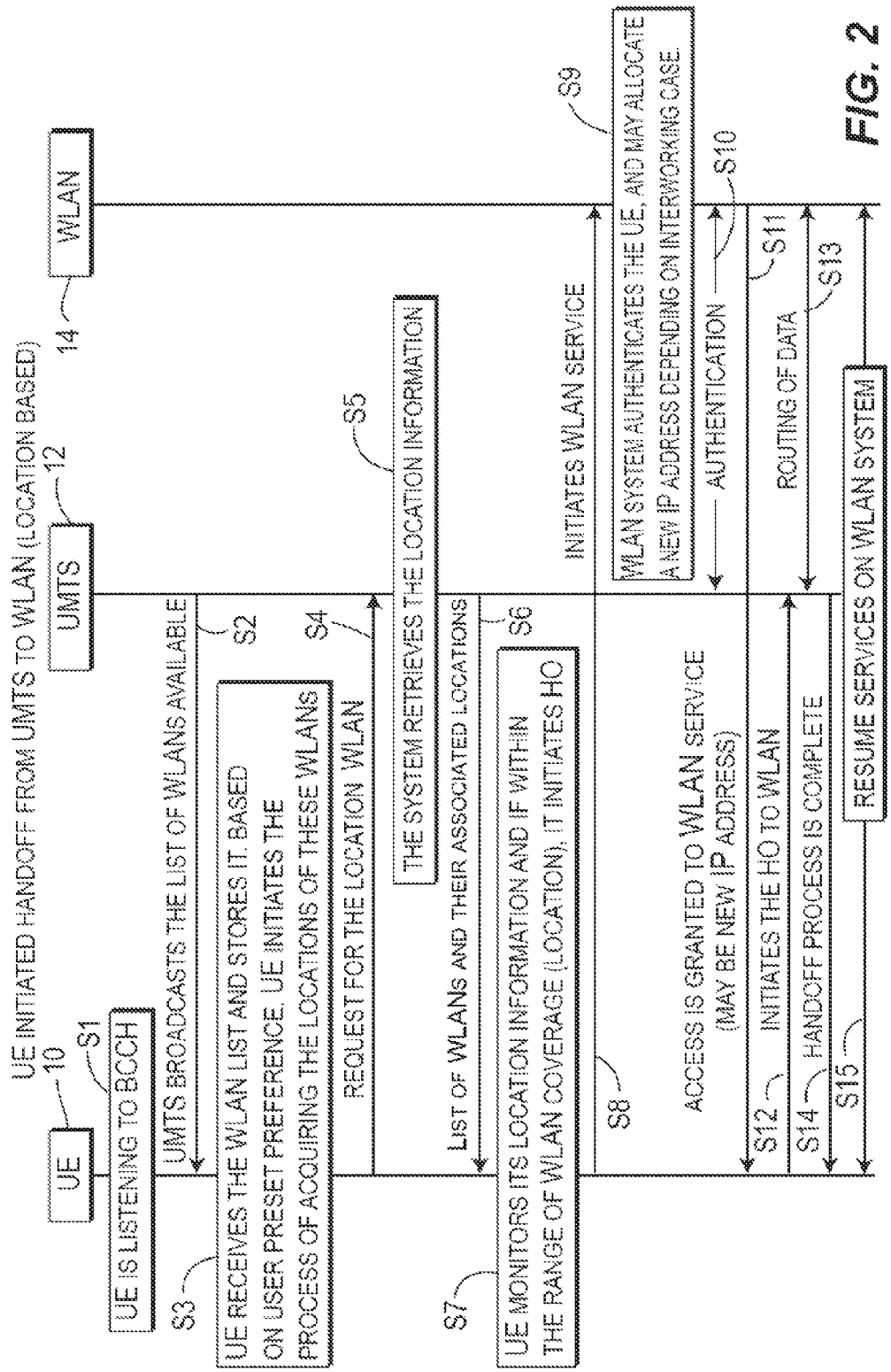
FIG. 2 is a flow diagram showing a UE initiated handoff from a UMTS to a WLAN which is location based.

FIG. 2 shows a more detailed UE—initiated handoff technique which is location based wherein the procedural steps take place between UE 10, UMTS 12 and WLAN 14.

At step S1, UE 10 listens to the broadcast control channel (BCCH).

UMTS 12 broadcasts a list of WLANs available, at step S2. At step S3, UE 10 receives and stores the WLAN list and, based upon user preset preference, UE 10 initiates acquisition of the locations of the preferred WLANs and, at step S4, requests that UMTS 12 provide the locations of the preferred WLANs. At step S5, UMTS 12 retrieves the location information and provides UE 10 with a list of the WLANs and their associated locations, at step S6.

At step S7, UE 10 monitors the location information and initiates a handoff (HO) when UE 10 is in the range of the WLAN coverage, UE 10 initiating WLAN service to WLAN 14, at step S8.

WLAN 14, at step S9 authenticates the UE 10 through an interchange of information with UMTS 12, at step S10 and, depending upon the interworking case, at step S11, grants access to UE 10 and may provide a new internet protocol (IP) address depending on the interworking case.

UE 10, at step S12, initiates the handoff to the WLAN through UMTS 12, data being routed through a communication link between UMTS 12 and WLAN 14, at step S13.

UMTS 12, at step S14, provides a message to UE 10 that the handoff process is complete and, at step S15, services are resumed on the WLAN system 14 between UE 10 and WLAN 14.

Figure 3:
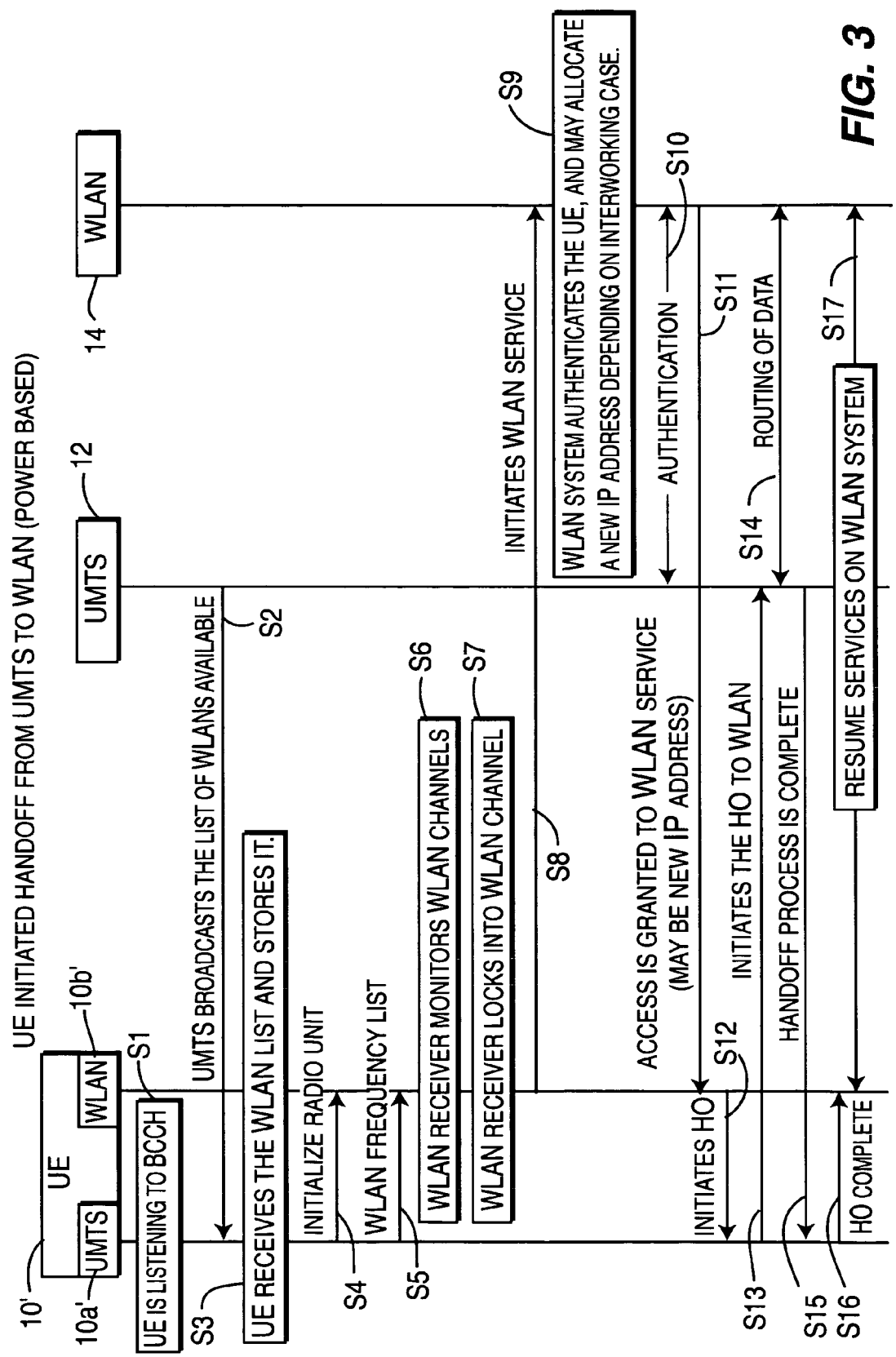
FIG. 3 is a flow diagram showing a UE initiated handoff from a UMTS to a WLAN which is power based.

FIG. 3 shows another technique for a UE initiated handoff from a UMTS 12 to a WLAN 14, UE 10' having communication capability with the UMTS 12 at 10a' and with the WLAN14, at 10b'.

At step S1, UE 10' listens to the broadcast channel (BCCH), UMTS 12, at step S2, broadcasting the list of available WLANs in the channel.

UE 10', at step S3, receives and stores the WLAN frequency list. UE 10' initializes radio unit 10b' at step S4 and, at step S5, transmits the WLAN frequency list to 10b'. The WLAN receiver 10b' monitors the WLAN channels, at step S6 and, at step S7, locks onto a WLAN channel and initiates WLAN service with WLAN 14, at step S8.

At step S9, WLAN 14 authenticates the UE 10' through an interchange of information with UMTS 12, at step S10. At step S11, WLAN 14 grants access to WLAN service and may allocate a new IP address depending upon the interworking case. The handoff is initiated between 10b' and 10a' at step S12 and 10a', at step S13, initiates the handoff to WLAN 14 through UMTS 12 which routes data to WLAN 14, at step S14.

UMTS 12, at step S15, alerts unit 10a' that the handoff process is complete and 10a', at step S16 alerts 10b' that the HO process is complete, whereupon services on the WLAN system are resumed between UE 10' and WLAN 14, at step S17.

Figure 4:
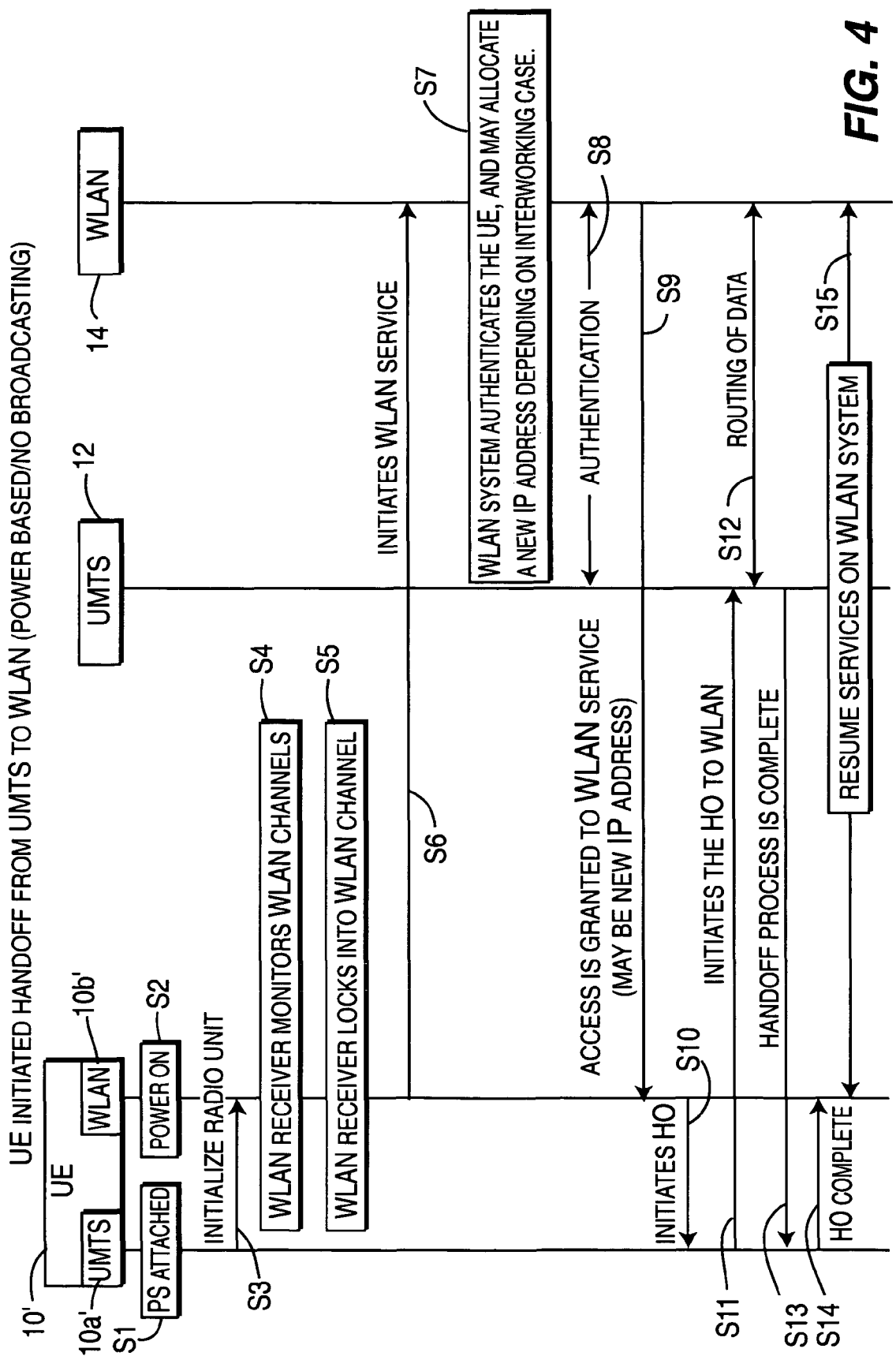
FIG. 4 is a flow diagram showing a UE initiated handoff from a UMTS to a WLAN, which is power based with no broadcasting.

FIG. 4 shows a UE-initiated handoff technique from UMTS 12 to WLAN 14 wherein UE 10' shown in FIG. 4 is similar in structure to the UE 10' shown in FIG. 3. In this embodiment, the handoff is power based and no broadcasting takes place.

The packet switched (PS) is attached, at step S1, from unit 10a' and the power at 10b' is turned on, at step S2. Unit 10a', at step S3, initializes the radio unit of 10b', whereupon 10b', at step S4, has its receiver monitor WLAN channels, locking onto a WLAN channel, at step S5, and initiating WLAN service with WLAN 14, at step S6.

WLAN 14 authenticates UE 10', at step S7, through an authentication procedure with UMTS 12, at step S8, and grants access to WLAN service at step S9 and may allocate a new IP address depending on the interworking case.

Unit 10b', at step S10, initiates the handoff (HO) with unit 10a' which, at step S11, initiates the handoff to WLAN 14 through UMTS 12, which is routed between UMTS 12 and WLAN 14, at step S12, and UMTS 12 alerts unit 10a' that the handoff process is complete, at step S13. Unit 10a', at step S14, alerts unit 10b' that the handoff is complete, whereupon services on the WLAN system are resumed between UE 10' and WLAN 14, at step S15.

Figure 5:
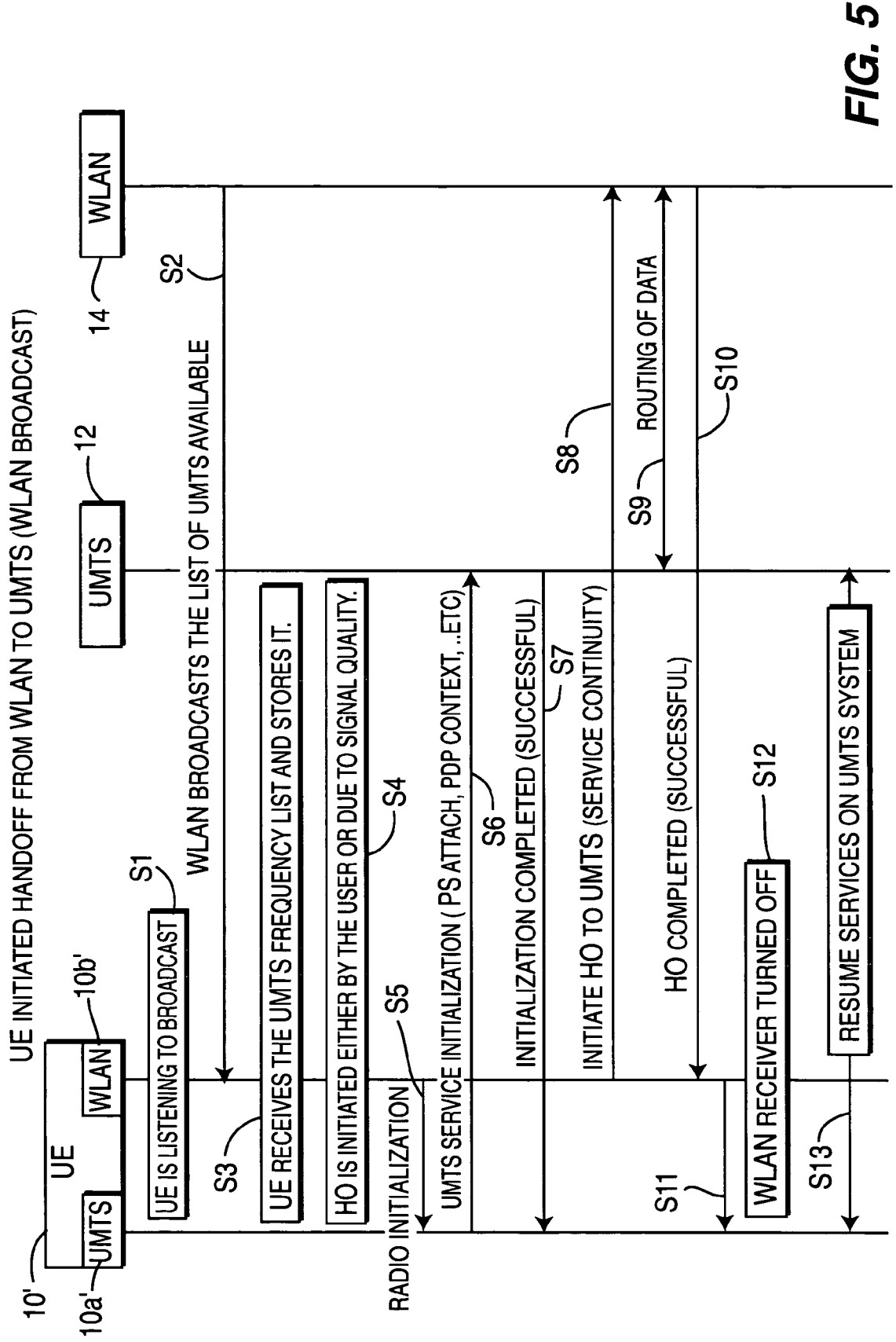
FIG. 5 is a flow diagram showing a UE initiated handoff from a WLAN to a UMTS employing a WLAN broadcast technique.

FIG. 5 shows another UE-initiated handoff technique utilizing a WLAN broadcast. UE 10' is similar to UE 10' shown in FIGS. 3 and 4.

The UE, through unit 10b', listens to the broadcast, at step S1, the broadcast of the list of UMTSs available being provided by WLAN 14, at step S2. UE 10' through unit 10b', receives and stores the UMTS frequency list, at step S3, and initiates handoff (HO) by way of a user initiation or, based on signal quality, at step S4, when the HO is initiated, the user selects a preset preference. When signal quality is used as a criteria, a measure of the signal quality is made and HO is initiated when the signal quality achieves a predetermined threshold.

Upon initiation of the handoff, 10b', at step S5, causes radio initialization at unit 10a'. Unit 10a', at step S6, starts UMTS service initialization, which includes package switched (PS) attached, packet data protocol (PDP) context and so forth. UMTS 12, at step S7, completes initialization advising unit 10a' that initialization is successful. At step S8, UE 10', through unit 10b', initiates the handoff to the UMTS (service continuity). At step S9, the routing of data occurs between WLAN 14 and UMTS 12, whereupon WLAN 14, at step S10, alerts unit 10b' that the handoff is completed (and it was successful). Unit 10b', at step S11, alerts 10a' that the handoff is completed and turns the WLAN receiver off, at step S12, whereupon services are resumed on the WLAN system between UMTS 12 and unit 10a', at step S13.

Figure 6:
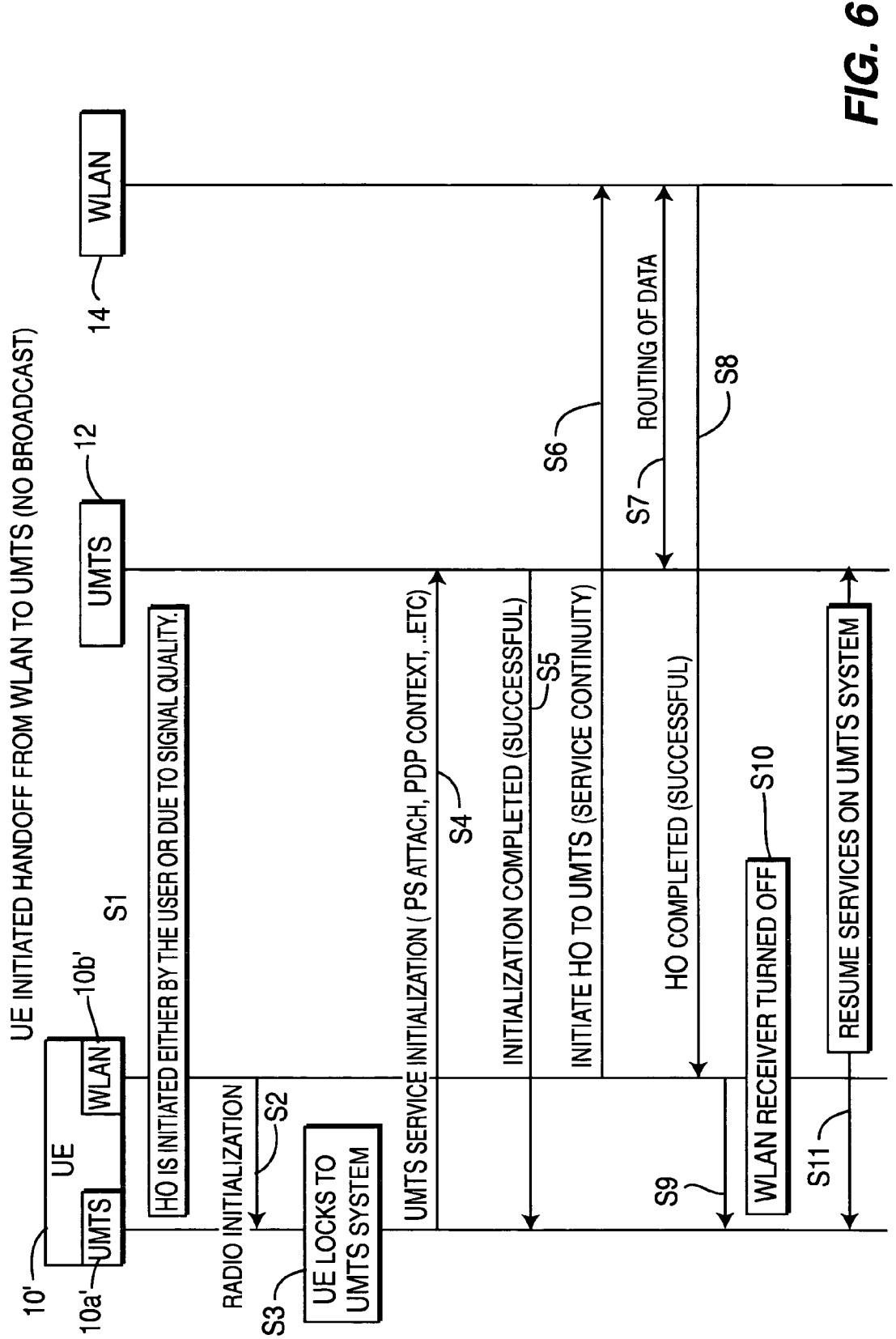
FIG. 6 is a flow diagram showing a UE initiated handoff from a WLAN to a UMTS where there is no broadcast.

FIG. 6 shows a UE—initiated handoff from a WLAN 14 to an UMTS 12. In this embodiment, UE 10', through unit 10b', initiates a handoff either by the user or automatically, due to signal quality, at step S1, the procedures herein being substantially identical to those described in connection with step S4 in the embodiment of FIG. 5.

Unit 10b', at step S2, causes radio initialization at 10a' which, at step S3, locks onto the UMTS system 12, and performs UMTS service and initialization, which step is substantially identical to step S6 shown in the embodiment of FIG. 5. Thereafter, steps S5 through S11 of FIG. 6 which are substantially identical to steps S7 through S13, respectively shown in FIG. 5, are performed, the difference between the embodiments of FIG. 5 and FIG. 6 being that there is no WLAN broadcast in the embodiment of FIG. 6.

FIG. 7 shows a UMTS system initiated handoff from a UMTS 12 to WLAN 14, the handoff technique being power based.

UE 10', through unit 10a' listens to the broadcast channel (BCCH) at step S1, UMTS 12 broadcasting a list of WLANs available, at step S2. UE 10', through unit 10a', receives and stores the WLAN frequency list, at step S3 and, at step S4, initializes the radio unit at 10b' providing the frequency list to unit 10b', at step S5. The WLAN receiver, at unit 10b', monitors the WLAN channels, at step S6, providing a measurement report to unit 10a' at step S7, which report is relayed from unit 10a' to UMTS 12, at step S8.

UMTS 12, at step S9, targets a specific WLAN and initiates the handoff process, providing the target WLAN system of the handoff process to unit 10a', at step S10.

UE 10', through unit 10a' alerts unit 10b' of the target WLAN system and the WLAN receiver of unit 10b' locks onto the WLAN channel of the target WLAN system, at step S12 and communicates with WLAN 14 to initiate the WLAN service, at step S13.

WLAN 14 authenticates UE 10' through communication with UMTS 12, at step S14 and, at step S15, grants access by communicating with unit 10b' which, at step S16, alerts unit 10a' that the handoff is complete. Unit 10a', at step S17, alerts UMTS 12 that the handoff to WLAN 14 is complete, whereupon UMTS 12 routes data to WLAN 14, at step S18. UMTS 12, at step S19, advises unit 10a' that the handoff process is complete, whereupon, unit 10a', at step S20, advises unit 10b' that the process is complete, whereupon service on the WLAN system between UE10' and 14 takes place, at step S21.

What is claimed is:

1. A method for use in a user equipment (UE), the method comprising:
   the UE communicating data via a cellular access network using a first Internet Protocol (IP) address;
   the UE sending a request message via the cellular access network, the request message indicating a request for information related to access networks available for handoff;
   the UE receiving a network information message via the cellular access network, wherein the network information message is responsive to the request message and indicates a plurality of wireless local area networks (WLANs) available for handoff;
   the UE selecting a WLAN from the plurality of WLANs for handoff based on the network information message;
   the UE performing a handoff from the cellular access network to the selected WLAN; and
   the UE communicating data via the selected WLAN using a second IP address.

2. The method of claim 1, wherein the selecting the WLAN for handoff is further based on a user preference.

3. The method of claim 1, wherein the selecting the WLAN for handoff is further based on a received signal power level.

4. The method of claim 1, wherein the network information message further indicates a location of each of the WLANs.

5. The method of claim 1 wherein the request message indicates a request for information related to access networks available for handoff in an area close to the UE.

6. The method of claim 1, wherein the sending the request message is performed based on a user preference.

7. The method of claim 1, wherein the network information message indicates coordinates of each of the WLANs.

8. The method of claim 1, further comprising:
receiving information via the WLAN that indicates the second IP address.

9. A user equipment (UE) comprising:
a first transceiver configured to:
receive a service via a cellular access network using a first Internet Protocol (IP) address;
send a request message via the cellular access network, the request message indicating a request for information related to access networks available for handoff;
receive a network information message via the cellular access network, wherein the network information message is responsive to the request message and indicates a plurality of wireless local area networks (WLANs) available for handoff; and
a processor configured to select a WLAN of the plurality of WLANs for handoff based on the network information message; and
a second transceiver configured to:
perform a handoff from the cellular access network to the selected WLAN; and
communicate data via the selected WLAN using a second IP address.

10. The UE of claim 9, wherein the processor is configured to initiate the handoff further based on a user preference.

11. The UE of claim 9, wherein the processor is configured to initiate the handoff further based on a received signal power level.

12. The UE of claim 9, wherein the network information message further indicates a location of each of the WLANs.

13. The method of claim 1 wherein the request message indicates a request for information related to access networks available for handoff in a cell serving the UE.

14. The UE of claim 9 wherein the request message indicates a request for information related to access networks available for handoff in a cell serving the UE.

15. The UE of claim 9 wherein the request message indicates a request for information related to access networks available for handoff in an area close to the UE.

16. The UE of claim 9, wherein the first transceiver is configured to send the request message based on a user preference.

17. The UE of claim 9, wherein the network information message indicates coordinates of each of the WLANs.

18. The UE of claim 9, wherein the second transceiver is further configured to receive information via the WLAN that indicates the second IP address.

19. A method for use in a user equipment (UE), the method comprising:
the UE communicating data via a cellular access network using an Internet Protocol (IP) address;
the UE sending a request message via the cellular access network, the request message indicating a request for information related to access networks available for handoff;
the UE receiving a network information message via the cellular access network, wherein the network information message is responsive to the request message and indicates a plurality of wireless local area networks (WLANs) available for handoff;
the UE selecting a WLAN from the plurality of WLANs for handoff based on the network information message;
the UE performing a handoff from the cellular access network to the selected WLAN; and
the UE communicating data via the selected WLAN using the IP address.

20. A user equipment (UE) comprising:
a first transceiver configured to:
receive a service via a cellular access network using an Internet Protocol (IP) address;
send a request message via the cellular access network, the request message indicating a request for information related to access networks available for handoff;
receive a network information message via the cellular access network, wherein the network information message is responsive to the request message and indicates a plurality of wireless local area networks (WLANs) available for handoff; and
a processor configured to initiate a handoff from the cellular access network to a WLAN of the plurality of WLANs based on the network information message; and
a second transceiver configured to:
perform a handoff from the cellular access network to the selected WLAN; and
communicate data via the selected WLAN using the IP address.

* * * * *